US011656455B2

(12) United States Patent
Kasetani

(10) Patent No.: US 11,656,455 B2
(45) Date of Patent: May 23, 2023

(54) PLANAR HEAT GENERATING BODY AND VEHICLE WINDSHIELD DEVICE

(71) Applicant: NIFCO INC., Kanagawa-ken (JP)

(72) Inventor: Yasuki Kasetani, Kanagawa-ken (JP)

(73) Assignee: NIFCO INC., Kanagawa-ken (JP)

( * ) Notice: Subject to any disclaimer, the term of this patent is extended or adjusted under 35 U.S.C. 154(b) by 0 days.

(21) Appl. No.: 17/262,589

(22) PCT Filed: Jul. 29, 2019

(86) PCT No.: PCT/JP2019/029647
§ 371 (c)(1),
(2) Date: Jan. 22, 2021

(87) PCT Pub. No.: WO2020/022520
PCT Pub. Date: Jan. 30, 2020

(65) Prior Publication Data
US 2021/0263305 A1    Aug. 26, 2021

(30) Foreign Application Priority Data

Jul. 27, 2018 (JP) .............................. JP2018-141009

(51) Int. Cl.
*G02B 27/00* (2006.01)
*B60R 11/04* (2006.01)
(Continued)

(52) U.S. Cl.
CPC .......... *G02B 27/0006* (2013.01); *B60R 11/04* (2013.01); *B60S 1/026* (2013.01);
(Continued)

(58) Field of Classification Search
CPC ................ G02B 27/0006; B60R 11/04; B60R 2011/0026; B60S 1/026; G03B 11/045; H05B 3/18; H05B 3/84; H05B 2203/003
(Continued)

(56) References Cited

U.S. PATENT DOCUMENTS 1,375,863 A * 4/1921 Stanton .................. H05B 3/342
219/212
3,010,007 A * 11/1961 Theodore ................. H05B 3/34
392/435
(Continued)

FOREIGN PATENT DOCUMENTS

DE         2407619 A1 *  8/1975 ............... H05B 3/28
DE   102007008833 A1     8/2008
(Continued)

OTHER PUBLICATIONS

Japanese Decision to Grant a Patent for Application No. 2020-532526 dated Nov. 17, 2020.
(Continued)

*Primary Examiner* — Dana Ross
*Assistant Examiner* — Ket D Dang
(74) *Attorney, Agent, or Firm* — Tarolli, Sundheim, Covell & Tummino LLP

(57) ABSTRACT

Provided are a planar heat generating body and a vehicle windshield device that are capable of effectively suppressing adhesion of foreign matter thereto. The planar heat generating body includes: a heat generating wire that repeatedly folds so as to cover a surface surrounded by an outline; and a conducting wire for supplying current to the heat generating wire, that has a lower electrical resistance than the heat generating wire, as a result of having a greater width than the heat generating wire, and follows the outline.

10 Claims, 6 Drawing Sheets

(51) Int. Cl.
  *B60S 1/02* (2006.01)
  *G03B 11/04* (2021.01)
  *H05B 3/18* (2006.01)
  *H05B 3/84* (2006.01)
  *B60R 11/00* (2006.01)

(52) U.S. Cl.
  CPC ............ *G03B 11/045* (2013.01); *H05B 3/18* (2013.01); *H05B 3/84* (2013.01); *B60R 2011/0026* (2013.01); *H05B 2203/003* (2013.01)

(58) Field of Classification Search
  USPC .......... 396/534; 219/522, 203, 541; 29/621; 336/331; 156/574
  See application file for complete search history.

(56) References Cited

U.S. PATENT DOCUMENTS

| | | | | |
|---|---|---|---|---|
| 6,654,551 | B1 * | 11/2003 | Stabile | F24D 13/022 392/435 |
| 2010/0224622 | A1 * | 9/2010 | Ceraso | H05B 3/30 219/540 |
| 2010/0270280 | A1 | 10/2010 | Blanchard et al. | |
| 2015/0321621 | A1 * | 11/2015 | Van Dan Elzen | B60S 1/56 348/148 |
| 2017/0295610 | A1 | 10/2017 | Usami et al. | |
| 2017/0334364 | A1 * | 11/2017 | Usami | B60R 11/04 |
| 2019/0031116 | A1 * | 1/2019 | Bulgajewski | H05B 3/84 |
| 2019/0200416 | A1 * | 6/2019 | Shinkai | H05B 3/84 |
| 2019/0297678 | A1 * | 9/2019 | Schlipf | H05B 3/262 |
| 2019/0297679 | A1 * | 9/2019 | Gima | H05B 3/84 |
| 2019/0342951 | A1 * | 11/2019 | Nakanishi | H05B 3/40 |

FOREIGN PATENT DOCUMENTS

| | | | |
|---|---|---|---|
| JP | S49-145741 | 12/1974 | |
| JP | S58-010318 Y2 | 2/1983 | |
| JP | H02-103340 | 10/1990 | |
| JP | H04-61792 U | 5/1992 | |
| JP | 2003257597 A | 9/2003 | |
| JP | 2017185896 | 10/2017 | |
| JP | 2017199565 | 11/2017 | |
| WO | 2017151348 | 9/2017 | |
| WO | WO-2017150817 A1 * | 9/2017 | ............ B41F 13/187 |

OTHER PUBLICATIONS

Japanese Office Action for Application No. 2020-532526 dated Oct. 2, 2020.

German Office Action for Application No. DE 11 2019 003 797.8 dated Sep. 2, 2021.

* cited by examiner

PLANAR HEAT GENERATING BODY AND VEHICLE WINDSHIELD DEVICE

RELATED APPLICATIONS

The present invention is a U.S. National Stage under 35 USC 371 patent application, claiming priority to Serial No. PCT/JP2019/029647, filed on 29 Jul. 2019; which claims priority of JP 2018-141009, filed on 27 Jul. 2018, the entirety of both of which are incorporated herein by reference.

TECHNICAL FIELD

The present invention relates to a vehicle windshield device mounted on, for example, a windshield of a vehicle and a planar heating element mounted on the vehicle windshield device.

BACKGROUND ART

A windshield device for a vehicle is used to detect the presence of other vehicles around the vehicle and the presence of obstacles around the vehicle. Objects such as dew, frost, and ice collected on a camera of the vehicle windshield device or a windshield cause a large error in a result of detection executed by the vehicle windshield device. The vehicle windshield device includes a planar heating element to limit collection of objects (refer to, for example, Patent Document 1).

PRIOR ART DOCUMENT

Patent Document

Patent Document 1: Japanese Laid-Open Patent Publication No. 2017-185896

SUMMARY OF THE INVENTION

Problems that the Invention is to Solve

The accuracy of specifying a range heated by the planar heating element needs to be increased to effectively limit collection of objects.

It is an object of the present invention to provide a planar heating element and a vehicle windshield device that effectively limit collection of objects.

Means for Solving the Problems

To achieve the above object, a planar heating element includes a heating wire that is repeatedly folded in a manner covering a plane surrounded by a contour line. The planar heating element further includes a conductive wire configured to supply electric current to the heating wire. The conductive wire has a width that is greater than a width of the heating wire so that the conductive wire has a lower electrical resistivity than the heating wire. The conductive wire is located outside the plane and follows the contour line. In this planar heating element, when current flows to the conductive wire and the heating wire, the difference in temperature between the conductive wire and the heating wire is greater than in a configuration in which a conductive wire and a heating wire have the same electrical resistivity. Thus, the range heated by the planar heating element is specified in the plane surrounded by the contour line with higher accuracy.

In the planar heating element, the heating wire may include a first end located at the contour line and a second end located at the contour line. The conductive wire may be connected to the first end and follow a portion of the contour line extending from the first end toward the second end. In this planar heating element, the conductive wire shortens the distance between the two ends, which are used to supply current to the planar heating element. This allows for reduction in size of a configuration that supplies current to the planar heating element.

In the planar heating element, the width of the conductive wire may be greater than or equal to two times the width of the heating wire. This planar heating element increases the effect of effectively limiting the collection of objects.

In the planar heating element, the heating wire and the conductive wire form a current-carrying portion. The planar heating element may further include an insulation film that covers the entire current-carrying portion and a planar good thermal conductor that covers at least part of the current-carrying portion with the insulation film located between the planar good thermal conductor and the current-carrying portion. In this planar heating element, the uniformity of the temperature distribution of the planar heating element is increased in the range where the current-carrying portion is covered by the planar good thermal conductor. For example, when the planar good thermal conductor is configured to cover the entire current-carrying portion, the temperature distribution is uniformed in the entire current-carrying portion. When the planar good thermal conductor is configured to cover part of the current-carrying portion, the temperature distribution is uniformed in part of the current-carrying portion.

In the planar heating element, the planar good thermal conductor may cover at least part of the heating wire with the insulation film located between the planar good thermal conductor and the heating wire. This configuration facilitates transmission of heat that is output from the heating wire to the planar good thermal conductor and thus is suitable for uniforming the heat output from the heating wire.

In the planar heating element, the insulation film is attached to the current-carrying portion. The planar good thermal conductor may be attached to the insulation film. In this configuration, the planar heating element is positioned in relation to the current-carrying portion. This further increases the accuracy of the position where the above advantage is obtained.

To achieve the above object, a vehicle windshield device includes a camera cover, a camera unit located in the camera cover, a light blocking hood located in the camera cover, and a planar heating element configured to heat the light blocking hood. The planar heating element is the planar heating element described above.

To achieve the above object, a vehicle windshield device includes a camera cover, a camera unit located in the camera cover, a light blocking hood located in the camera cover, and a planar heating element configured to heat the light blocking hood. The planar heating element includes a current-carrying portion and an insulation film that covers the entire current-carrying portion. The current-carrying portion includes a heating wire that is repeatedly folded in a manner covering a plane surrounded by contour line. The current-carrying portion further includes a conductive wire configured to supply electric current to the heating wire. The conductive wire has a width that is greater than a width of the heating wire so that the conductive wire has a lower electrical resistivity than the heating wire. The conductive wire is located outside the plane and follows the contour line. The vehicle windshield device further includes a planar good thermal conductor that covers at least part of the current-carrying portion with the insulation film located between the planar good thermal conductor and the current-carrying portion.

The vehicle windshield device described above increases the uniformity of the temperature distribution of the planar heating element, ultimately, the uniformity of the temperature distribution of the camera cover, in the range where the current-carrying portion is covered by the planar good thermal conductor.

In the vehicle windshield device, the light blocking hood may include the planar good thermal conductor. In this vehicle windshield device, the range where the temperature distribution is uniformed is positioned in the light blocking hood. Thus, the region where the temperature distribution is uniformed in the light blocking hood may be fixed in the light blocking hood regardless of the accuracy of positioning the planar heating element.

MODES FOR CARRYING OUT THE INVENTION

Figure 1:
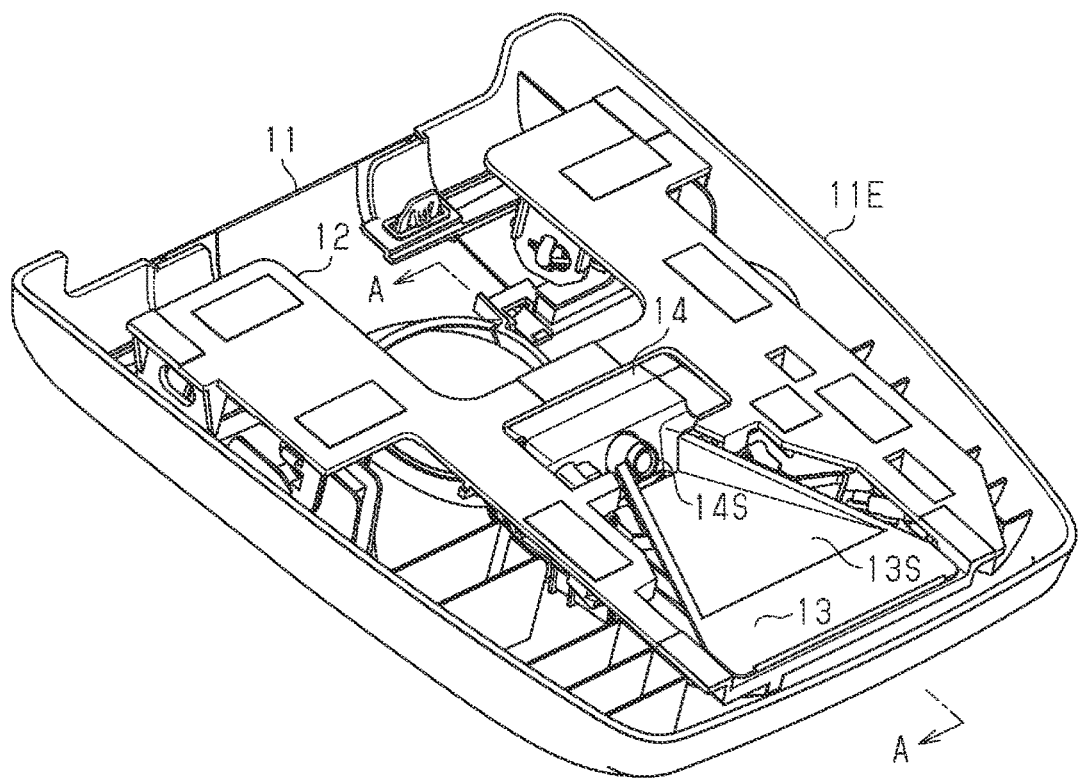
FIG. 1 is a perspective view showing a structure of an embodiment of a vehicle windshield device.

An embodiment of a planar heating element and a vehicle windshield device will now be described. A vehicle windshield device will first be described with reference to FIGS. 1 and 2. Then, a planar heating element will be described with reference to FIGS. 3 to 10. Vehicle Windshield Device As shown in FIG. 1, a vehicle windshield device includes a camera cover 11, a camera bracket 12, a light blocking hood 13, and a camera unit 14.

The camera cover 11 is a bowl-shaped plastic member. The camera cover 11 accommodates the camera bracket 12, the light blocking hood 13, and the camera unit 14. When a peripheral edge 11E of the camera cover 11 is opposed to a side surface of a windshield WG (see FIG. 2) located in the passenger component, the camera cover 11 is attached to the windshield WG of the vehicle.

The camera bracket 12 is a plate-shaped plastic member. The camera bracket 12 is shaped to extend along the windshield. The camera bracket 12 supports the camera unit 14 and is fitted to the camera cover 11. The camera unit 14 is accommodated between the camera bracket 12 and the camera cover 11. The camera bracket 12 exposes a light receiving portion of the camera unit 14 toward the windshield.

The light blocking hood 13 is trapezoidal as viewed from the windshield and is a black plate-like plastic member. The light blocking hood 13 may be changed into various planar shapes such as a circle, an ellipse, or a polygon. The light blocking hood 13 determines a range of light received by the light receiving portion. The light blocking hood 13 has a front surface that is opposed to the windshield WG and includes a light blocking sheet 13S. The light blocking sheet 13S is a trapezoidal black sheet and is, for example, a non-woven cloth attached to the front surface of the light blocking hood 13. The light blocking sheet 13S diffuses external light such as sunlight and street lights to limit entrance of external light into the light receiving portion of the camera unit 14.

When the humidity of the passenger compartment is high or the temperature of the outside of the vehicle is low, dew, frost, and ice collect on the windshield WG. Dew, frost, and ice collected on the windshield diffuse reflection light of other vehicles around the vehicle and reflection light of obstacles around the vehicle. In this regard, the vehicle windshield device includes a planar heating element 20 so that other vehicles around the vehicle and obstacles around the vehicle are detected with high accuracy.

Figure 2:
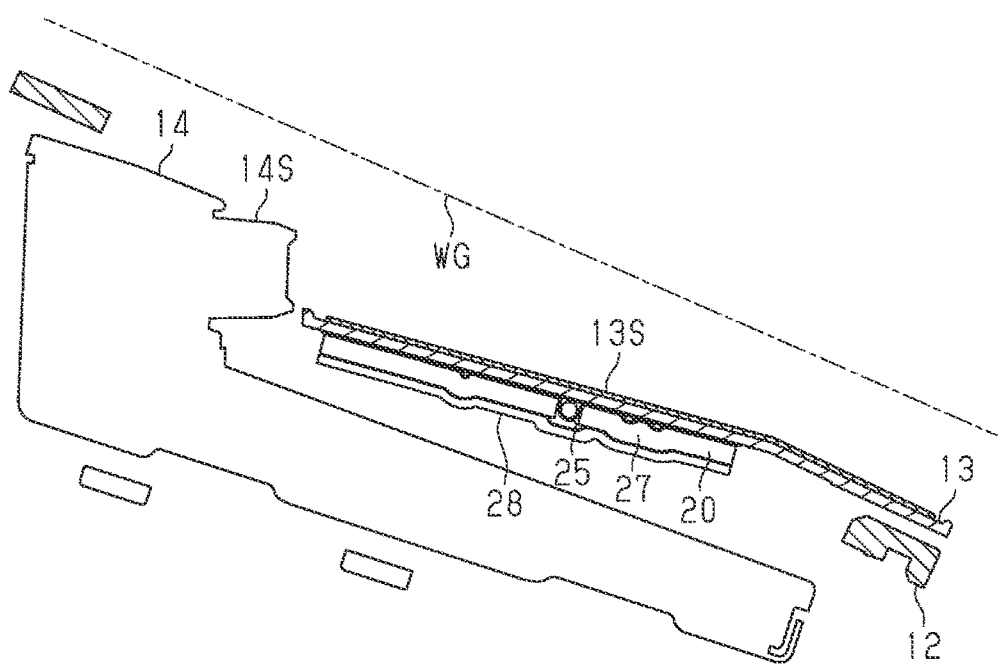
FIG. 2 is a cross-sectional view taken along line A-A in FIG. 1 showing the position of a planar heating element.

As shown in FIG. 2, the light blocking hood 13 has a rear surface including, for example, a bent surface projecting toward the windshield WG and a curved surface moderately projecting toward the windshield WG. The rear surface of the light blocking hood 13 is a subject that is heated by the planar heating element 20. The planar heating element 20 is located on the rear surface of the light blocking hood 13. The region subject to heating by the planar heating element 20 is substantially identical in shape with the light blocking sheet 13S. The region subject to heating by the planar heating element 20 may be greater than the light blocking sheet 13S or may be less than the light blocking sheet 13S. The region subject to heating by the planar heating element 20 may be appropriately changed in accordance with a request made to the vehicle windshield device. The area of the region subject to heating by the planar heating element 20 is for example, 15 $cm^2$.

The camera unit 14 points the light receiving portion 14S of the camera unit 14 toward the windshield WG from the light blocking sheet 13S. The camera unit 14 receives light that is reflected by an object located in front of the camera unit 14 through the windshield WG. The range of light that is received by the light receiving portion is determined by an angle of view of a lens of the light receiving portion and the shape of the light blocking hood 13 described above.

Planar Heating Element 20

Figure 3:
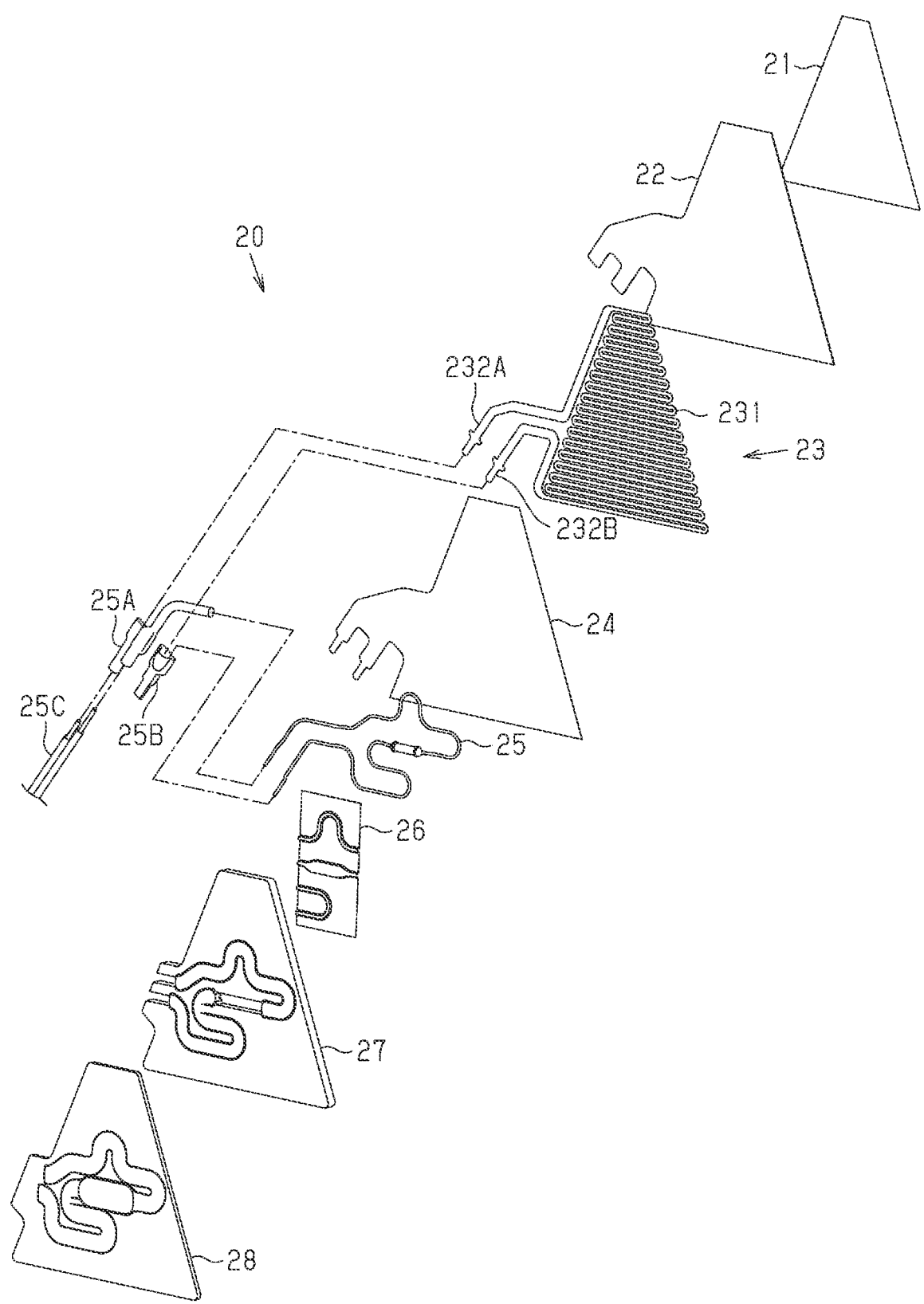
FIG. 3 is an exploded perspective view showing a layer structure of an embodiment of a planar heating element.

As shown in FIG. 3, the planar heating element 20 includes a planar good thermal conductor 21, a front insulation film 22, a current-carrying portion 23, a rear insulation film 24, a protection circuit 25, fixing tape 26, a first elastic sheet 27, and a second elastic sheet 28. For the sake of convenience of describing the layer structure of the planar heating element 20, a side of the planar heating element 20 opposed to the light blocking hood 13 is referred to as the front side, and a side of the planar heating element 20 opposite from the front side is referred to as the rear side.

The planar good thermal conductor 21 is a metal film, metal tape, a plastic film having a high thermal conductivity, or plastic tape having a high thermal conductivity. The planar good thermal conductor 21 is, for example, an aluminum film or aluminum tape having a thickness of 0.5 mm. The planar good thermal conductor 21 has a higher thermal conductivity than the front insulation film 22, the rear insulation film 24, the fixing tape 26, the first elastic sheet 27, and the second elastic sheet 28. In the surface of the planar heating element 20, the planar good thermal conductor 21 increases uniformity of a temperature distribution in the range where the planar good thermal conductor 21 is located.

The front insulation film 22 has an insulation property and thermal resistance at a usage temperature of the planar heating element 20. The front insulation film 22 is, for example, a polyimide film having a thickness of 0.1 mm. The front insulation film 22 has a rear surface (frontward surface on the plane of FIG. 3) including an adhesive. The front insulation film 22 insulates electrical connection of the current-carrying portion 23 from other conductors to protect electrical properties of the current-carrying portion 23. In addition, the front insulation film 22 buffers an impact transmitted to a heat generator 231 from the front side of the planar heating element 20 to protect mechanical properties of the current-carrying portion 23.

The current-carrying portion 23 includes the heat generator 231 formed by a single heating wire and wire portions 232A and 232B formed by two conductive wires. The heating wire that forms the heat generator 231 is shaped in conformance with the rear surface of the front insulation film 22.

The wire portion 232A is connected to one of leads 25C through a heat-shrink tube. The wire portion 232B is accommodated in a heat-shrink tube and is connected to the protection circuit 25. The heat generator 231 is supplied with current from an external circuit through the leads 25C and the wire portions 232A and 232B to generate a rated amount of heat. The rated amount of heat generated by the heat generator 231 is, for example, 0.5 W/cm$^2$.

The rear insulation film 24 has an insulation property and thermal resistance at a usage temperature of the planar heating element 20. The rear insulation film 24 insulates electrical connection of the current-carrying portion 23 from other conductors to protect electrical properties of the current-carrying portion 23. The rear insulation film 24 is thinner than the front insulation film 22 and is, for example, a polyimide film having a thickness of 0.03 mm The protection circuit 25 limits the temperature of the planar heating element 20 to a predetermined range. The protection circuit 25 includes a thermal fuse. One end of the thermal fuse is accommodated in a heat-shrink tube and is connected to the wire portion 232B. The other end of the thermal fuse is connected to the other one of the leads 25C.

The leads 25C connect the current-carrying portion 23 and the protection circuit 25 to an external circuit. The current-carrying portion 23 and the leads 25C extend through heat-shrink tubes 25A and 25B. The heat-shrink tubes 25A and 25B shrink to join the current-carrying portion 23 and the leads 25C. The fixing tape 26 fixes the protection circuit 25 to the rear insulation film 24. The fixing tape 26 is, for example, polyimide tape having an insulation property and thermal resistance.

The first elastic sheet 27 is thermally insulative and waterproof and has a gripping property at a usage temperature of the planar heating element 20. The first elastic sheet 27 is, for example, a foamed plastic film or a rubber film. The first elastic sheet 27 has a higher shock absorption than the second elastic sheet 28. The first elastic sheet 27 is, for example, a flame resistant urethane film having a thickness of 2 mm. The first elastic sheet 27 is in tight contact with the rear insulation film 24 and the second elastic sheet 28. The first elastic sheet 27 is also in tight contact with the fixing tape 26 and the second elastic sheet 28.

Figure 4:
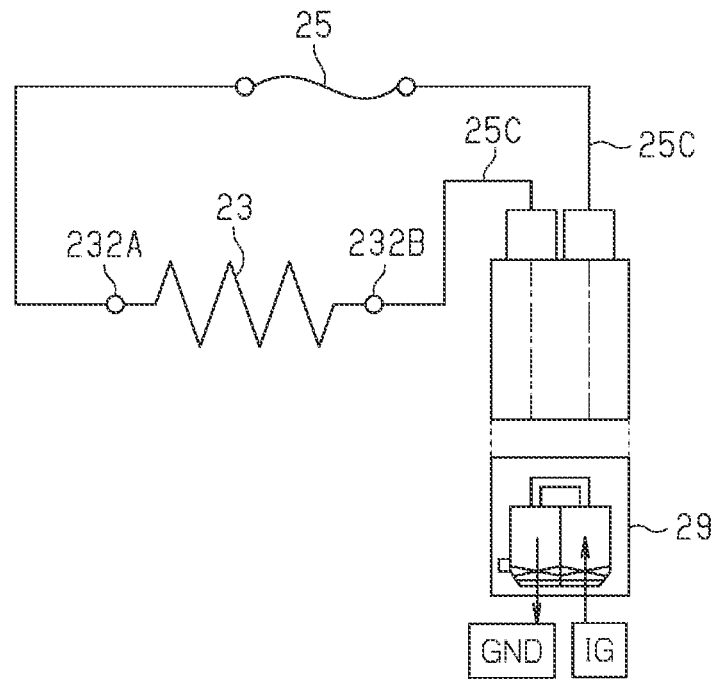
FIG. 4 is a circuit diagram showing connection between a current-carrying portion and a thermal fuse.

The second elastic sheet 28 is thermally insulative and has an impact resistance at a usage temperature of the planar heating element 20. The second elastic sheet 28 is, for example, a foamed plastic film or a rubber film. The second elastic sheet 28 has a higher impermeability to water vapor than the first elastic sheet 27. The second elastic sheet 28 is, for example, a dust-proof polyolefin foam film having a thickness of 1 mm As shown in FIG. 4, the current-carrying portion 23 and the protection circuit 25 form a single series circuit. The series circuit includes an input terminal and an output terminal that are connected to an external connector 29 by different ones of the leads 25C. The external connector 29 has one terminal connected to a ground potential. The external connector 29 has the other terminal connected to an ignition power supply.

Current-Carrying Portion 23

Figure 5:
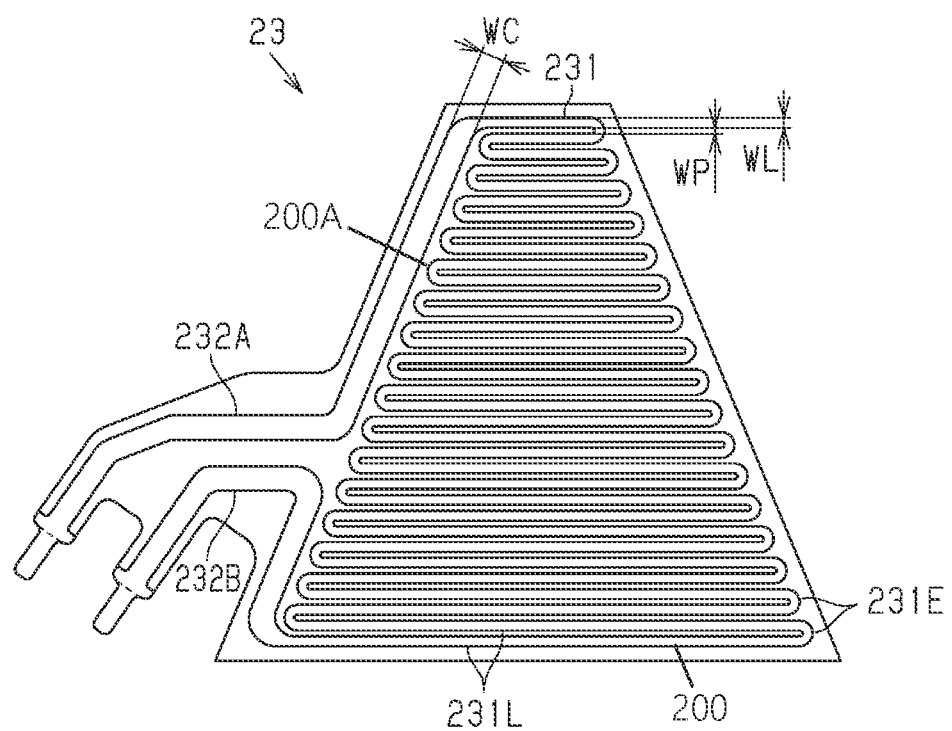
FIG. 5 is a plan view showing an example of a structure of the current-carrying portion.

FIG. 5 shows an example of a structure of the current-carrying portion 23.

Figure 6:
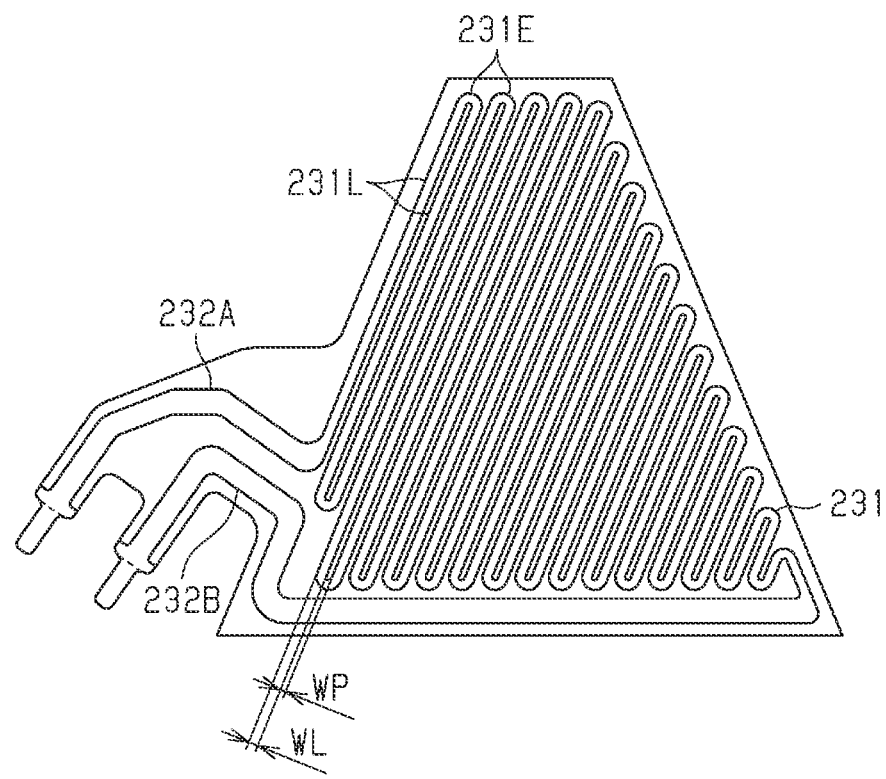
FIG. 6 is a plan view showing another example of a structure of the current-carrying portion.

FIG. 6 shows another example of a structure of the current-carrying portion 23.

As shown in FIGS. 5 and 6, the current-carrying portion 23 includes the heat generator 231 obtained by extending a single heating wire throughout a plane and the wire portions 232A and 232B that supply power to the heat generator 231. The heat generator 231 and the wire portions 232A and 232B are configured to be a single band-shaped conductor formed from the same material. The heat generator 231 includes linear portions 231L and folded portions 231E. In the heat generator 231, the single heating wire extends in a planar manner. The linear portions 231L are arranged in lines that are parallel to each other. The folded portions 231E are located on the peripheral edge of the heat generator 231 and connect ends of adjacent ones of the linear portions 231L.

The heating wire that forms the heat generator 231 is, for example, band-shaped and has a thickness of 0.03 mm. The heating wire forming the heat generator 231 is formed of, for example, SUS304. The heat generator 231 has substantially the same shape and size as the light blocking sheet 13S. The shape of the heat generator 231 may be changed and may differ from the shape of the light blocking sheet 13S. The size of the heat generator 231 may be greater than the size of the light blocking sheet 13S or may be less than the size of the light blocking sheet 13S.

In the heat generator 231, a width WL of the heating wire is greater than a width WP between adjacent ones of the linear portions 231L. The width WP between adjacent ones of the linear portions 231L is, for example, greater than or equal to 0.4 mm and less than or equal to 0.6 mm. The width WL of the heating wire is, for example, greater than or equal to 1.4 times and less than or equal to 1.6 times the width WP between adjacent ones of the linear portions 231L. The width WL of the heating wire refers to a dimension of the heating wire in a direction orthogonal to an extension direction of the heating wire. The width WP between adjacent ones of the linear portions 231L refers to a dimension of a gap between adjacent ones of the linear portions 231L in a direction orthogonal to an extension direction of the linear portions 231L.

Each of the wire portions 232A and 232B is a conductive wire. Each conductive wire has one end connected to an end of the heat generator 231. The end of the heat generator 231 connected to the end of one conductive wire differs from the end of the heat generator 231 connected to the end of the other conductive wire. The conductive wires extend outside the heat generator 231 at positions differing from each other. The other end of one conductive wire and the other end of the other conductive wire are located outside the heat generator 231 and spaced apart each other.

At least one of the wire portions 232A and 232B follows a contour line 200 of the heat generator 231. In FIG. 5, the contour line 200 of the heat generator 231 shows an isosceles trapezoid extending through all of the folded portions 231E. The two ends of the heat generator 231 are located at an upper end and a lower end of the left leg of the isosceles trapezoid.

The wire portion 232A is located outside the isosceles trapezoid, that is, outside the plane surrounded by the contour line 200. The wire portion 232A extends from the upper end of the left leg of the isosceles trapezoid toward an intermediate position of the leg. The upper end of the left leg of the isosceles trapezoid is an example of a first end connected to the wire portion 232A. In the wire portion 232A, the lower end of the left leg of the isosceles trapezoid is an example of a second end. The wire portion 232A follows a portion 200A of the contour line 200 extending from the first end connected to the wire portion 232A toward the second end.

The wire portion 232B is located outside the isosceles trapezoid, that is, outside the plane surrounded by the contour line. The wire portion 232B extend from the lower end of the left leg of the isosceles trapezoid toward an intermediate portion of the leg. The lower end of the left leg of the isosceles trapezoid is an example of a first end connected to the wire portion 232B. In the wire portion 232B, the upper end of the left leg of the isosceles trapezoid is an example of a second end. The wire portion 232B follows a portion of the contour line extending from the first end connected to the wire portion 232B toward the second end.

Each of the wire portions 232A and 232B extends leftward from the intermediate portion of the left leg of the isosceles trapezoid.

In FIG. 6, the contour line of the heat generator 231 shows an isosceles trapezoid extending through all of the folded portions 231E. The heat generator 231 has one end located at an intermediate portion of the left leg of the isosceles trapezoid. The heat generator 231 has the other end located at a right end of the lower base of the isosceles trapezoid.

The wire portion 232A is located outside the isosceles trapezoid, that is, outside the plane surrounded by the contour line. The wire portion 232A extends leftward from the intermediate portion of the left leg of the isosceles trapezoid. The intermediate portion of the left leg of the isosceles trapezoid is connected to the wire portion 232A.

The wire portion 232B is located outside the isosceles trapezoid, that is, outside the plane surrounded by the contour line. The wire portion 232B extends from the right end of the lower base of the isosceles trapezoid toward the left end and then extends toward the intermediate portion of the left leg of the isosceles trapezoid. The right end of the lower base of the isosceles trapezoid is an example of a first end connected to the wire portion 232B. In the wire portion 232B, the intermediate portion of the left leg of the isosceles trapezoid is an example of a second end. The wire portion 232B follows a portion of the contour line extending from the first end connected to the wire portion 232B toward the second end.

Each of the wire portions 232A and 232B extends leftward from the intermediate portion of the left leg of the isosceles trapezoid.

Each of the conductive wires forming the wire portions 232A and 232B is, for example, band-shaped and has a thickness of 0.03 mm. The conductive wires forming the wire portions 232A and 232B are formed of SUS304. A width WC of the conductive wire is greater than the width WL of the heating wire and is, for example, greater than or equal to 2 mm and less than or equal to 4 mm. For example, when the width WL of the heating wire is greater than or equal to 0.4 mm and less than or equal to 0.6 mm, the width WC of the conductive wire is greater than or equal to two times the width WL of the heating wire. The electrical resistivity of the wire portions 232A and 232B is sufficiently low as compared to than the electrical resistivity of the heat generator 231. Electrical resistivity refers to an electrical resistance of a heating wire per unit length and an electrical resistance of a conductive wire per unit length. The electrical resistivity of the wire portions 232A and 232B does not affect a temperature distribution of the current-carrying portion 23 when heat is generated by the heat generator 231.

Planar Good Thermal Conductor 21

Figure 7:
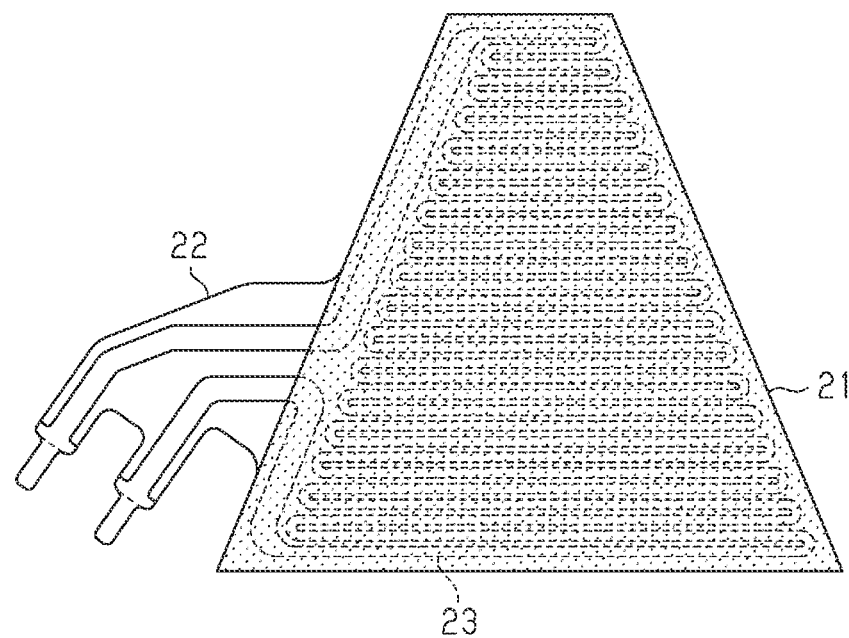
FIG. 7 is a plan view showing an example of a range in which a planar good thermal conductor is arranged.

FIG. 7 shows an example of a structure of the planar good thermal conductor 21.

Figure 8:
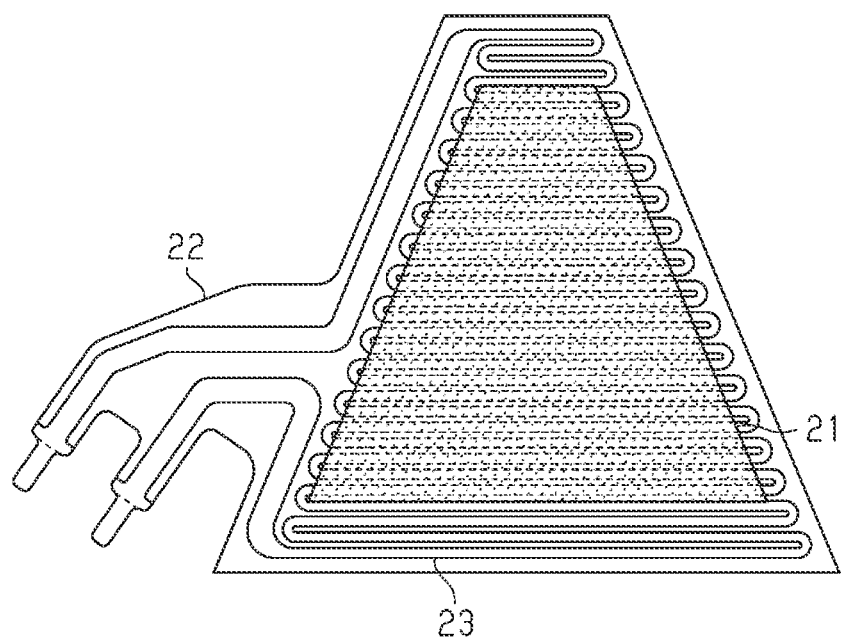
FIG. 8 is a plan view showing another example of a range in which a planar good thermal conductor is arranged.

FIG. 8 shows another example of a structure of the planar good thermal conductor 21.

The example of the planar good thermal conductor 21 shown in FIG. 7 has substantially the same shape and size as the front insulation film 22. The planar good thermal conductor 21 entirely covers the heat generator 231. The planar good thermal conductor 21 covers parts of the wire portions 232A and 232B, and the covered parts include parts connected to the heat generator 231. The parts of the wire portions 232A and 232B covered by the planar good thermal conductor 21 are parts of the wire portions 232A and 232B following the contour line of the heat generator 231. The planar good thermal conductor 21 is a metal film or a plastic film having a high thermal conductivity and is sandwiched between the light blocking hood 13 and the front insulation film 22. Alternatively, the planar good thermal conductor 21 is metal tape or plastic tape having a high thermal conductivity and is applied to the front insulation film 22 and positioned on the front insulation film 22.

When the heat generator 231 generates heat, the heat output from the heat generator 231 is first transferred to the planar good thermal conductor 21. The heat transferred to the planar good thermal conductor 21 is dissipated while being uniformed in the entire planar good thermal conductor 21. As a result, the temperature distribution of the current-carrying portion 23 is uniformed in the region where the planar good thermal conductor 21 is arranged, that is, the entire current-carrying portion 23. Thus, a situation in which the temperature is high only on the route of the heating wire is avoided.

As shown in FIG. 8, another example of the planar good thermal conductor 21 is mathematically similar in shape to the front insulation film 22 and is smaller than the front insulation film 22. The planar good thermal conductor 21 covers part of the heat generator 231 including a central part. The planar good thermal conductor 21 is located at a position that does not to overlap the wire portions 232A and 232B. The planar good thermal conductor 21 is metal tape or plastic tape having a high thermal conductivity and is applied to the front insulation film 22 and positioned on the front insulation film 22.

When the heat generator 231 generates heat, the heat output from the heat generator 231 is transferred from part of the heat generator 231 to the planar good thermal conductor 21 and is dissipated from the remaining part of the heat generator 231 through the front insulation film 22. The heat transferred to the planar good thermal conductor 21 is dissipated while being uniformed in the entire planar good thermal conductor 21. As a result, the temperature distribution of the current-carrying portion 23 is uniformed in the region where the planar good thermal conductor 21 is arranged, that is, only the part of the heat generator 231 including the central part. Thus, in the region, a situation in which the temperature is high only on the route of the heating wire is avoided.

The embodiment obtains the following advantages.

(1) In the viewpoint of limiting collection of objects such as dew, frost, and ice, the entire region subject to heating may need to be uniformly heated or only part of the region subject to heating may need to be heated more uniformly than the other part, in accordance with the mount position of the vehicle windshield device. In this regard, in the embodiment, when the planar good thermal conductor 21 is configured to cover the entire heat generator 231 and the planar heating element 20 heats, the temperature distribution is uniformed in the entire region subject to the heating.

(2) When the planar good thermal conductor 21 is configured to cover only part of the heat generator 231 and the planar heating element 20 heats, the temperature distribution is uniformed in only a desired range of the region subject to the heating.

(3) When the planar good thermal conductor 21 is sandwiched between the front insulation film 22 and the light blocking hood 13 or when the planar good thermal conductor 21 is attached to the front insulation film 22, the above advantages (1) and (2) are obtained. Therefore, a uniform temperature distribution is achieved without changes in major processes of manufacturing the planar heating element 20.

(4) When the planar heating element 20 starts heating, the responsiveness of increasing the temperature is improved in the entire region where the planar good thermal conductor 21 is arranged including gaps between adjacent ones of the heating wire. This allows functions such as detection by the vehicle windshield device to be performed from a time of starting to drive the vehicle.

(5) The planar good thermal conductor 21 applies the malleability unique to metal to substantially the entire planar heating element 20. The planar shape of the planar heating element 20 may be changed from a flat shape to a curved shape. This allows the planar heating element 20 to readily follow the shape of the light blocking hood 13.

(6) When the planar good thermal conductor 21 is configured to be attached to the front insulation film 22, the planar good thermal conductor 21 is positioned on the current-carrying portion 23. Thus, a range in which the temperature distribution is uniformed by the planar good thermal conductor 21 is stably positioned in the planar heating element 20.

(7) When the planar good thermal conductor 21 is a film or when the planar good thermal conductor 21 is tape, an excessive heat capacity of the planar good thermal conductor 21 is avoided. This increases the effect of a uniform temperature distribution and improves the responsiveness to an increase and a decrease in the temperature.

(8) When the width WP between adjacent ones of the linear portions 231L is greater than or equal to 0.4 mm and less than or equal to 0.6 mm and the width WL of the heating wire is greater than or equal to 1.4 times and less than or equal to 1.6 times the width WP between adjacent ones of the heating wire, the heating wire is uniformly and finely arranged. This increases the uniformity of an amount of heat generation per unit area of the planar heating element 20.

(9) When current flows to the current-carrying portion 23, the difference in temperature between the conductive wire and the heating wire is increased as compared to a configuration in which the conductive wire and the heating wire have the same electrical resistivity. Thus, the range heated by the planar heating element 20 is specified in the plane surrounded by the contour line with higher accuracy.

(10) As shown in FIG. 5, the wire portion 232A is connected to the first end and follows a portion of the contour line extending from the first end toward the second end. The wire portion 232B is connected to the first end and follows a portion of the contour line extending from the first end toward the second end. Thus, the wire portions 232A and 232B shorten the distance between two terminals for supplying current to the current-carrying portion 23 such as the heat-shrink tubes 25A and 25B. This allows for reduction in size of a configuration that supplies current to the planar heating element 20.

(11) When the width WL of the heating wire forming the heat generator 231 is, for example, greater than or equal to 0.4 mm and less than or equal to 0.6 mm and the width WC of the conductive wire forming the wire portions 232A and 232B is greater than or equal to 2 mm and greater than or equal to 4 mm, the width of the conductive wire is greater than or equal to two times the width of the heating wire. This increases the effect of obtaining advantage (9).

The embodiment may be modified as follows.

Heat Generator 231

The heat generator 231 may be formed of two or more heating wires. The heat generator 231 may be formed of, for example, one heating wire located on an outer peripheral portion of the heat generator 231 and another heating wire located on an inner peripheral portion located at an inner side of the outer peripheral portion. In another example, as viewed in a direction opposed to the heat generator 231, the heat generator 231 may be formed of one heating wire located at the right half and another heating wire located at the left half.

These configurations allow different amounts of heat to be generated between a heating element formed of one heating wire and a heating element formed of another heating wire. When the planar good thermal conductor 21 is located between a heating element formed of one heating wire and a heating element formed of another heating wire, a steep change in the temperature of the gap between the heating elements is limited.

The heat generator 231 may be changed so that the linear portions 231L are shaped as curved lines or waved lines.

Wire Portions 232A and 232B

The end of the wire portion 232A and the end of the wire portion 232B may be arranged at different sides or different corners in the contour line, which extends on the outer edge of the heat generator 231. Each conductive wire connected to the end of the heating wire may extend from the connected point to an outer side of the heat generator 231 and then connect to a corresponding one of the leads 25C.

Planar Good Thermal Conductor 21

In addition to metal such as aluminum, copper, and silver, carbon or ceramics, which is an inorganic oxide, or a composite material of these may be used as the material forming the planar good thermal conductor 21. In addition to a film obtained by rolling, a sheet formed from a number of fibers may be used as the material forming the planar good thermal conductor 21.

The planar good thermal conductor 21 may be sufficiently large as compared to the current-carrying portion 23 or the light blocking hood 13. The shape of the planar good thermal conductor 21 is not limited to the trapezoidal shape of the light blocking hood 13 and may be changed to other geometric shapes such as a circle, an ellipse, and a polygon, as well as various planar shapes including irregular shapes.

The planar good thermal conductor 21 may cover only part of the current-carrying portion 23 excluding the heat generator 231. This configuration achieves a uniform temperature distribution of the part of the heat generator 231 excluding the heat generator 231, which is, for example, a peripheral part of the heat generator 231 such as a region that surrounds the region subject to heating and needs to have a constant low temperature. The region surrounding the region subject to heating includes, for example, the wire portions 232A and 232B. That is, the planar good thermal conductor 21 only needs to cover at least part of the current-carrying portion 23.

When the light blocking hood 13 is coupled to the camera cover 11, the planar heating element 20 including the planar good thermal conductor 21 may be sandwiched by the camera cover 11 and the light blocking hood 13 and held by the camera cover 11.

When the light blocking hood 13 includes the planar good thermal conductor 21, a configuration that holds the planar good thermal conductor 21 on the rear side of the light blocking sheet 13S at the front side of the light blocking hood 13 or a configuration that insert-molds the planar good thermal conductor 21 integrally with the light blocking hood 13 may be used instead of a configuration that attaches the planar good thermal conductor 21 to the rear surface of the light blocking hood 13.

Wire Portions 232A and 232B

At least one of the wire portions 232A and 232B may be configured not to include the conductive wire and may be planar and be directly connected to the end of the heating wire.

Figure 9:
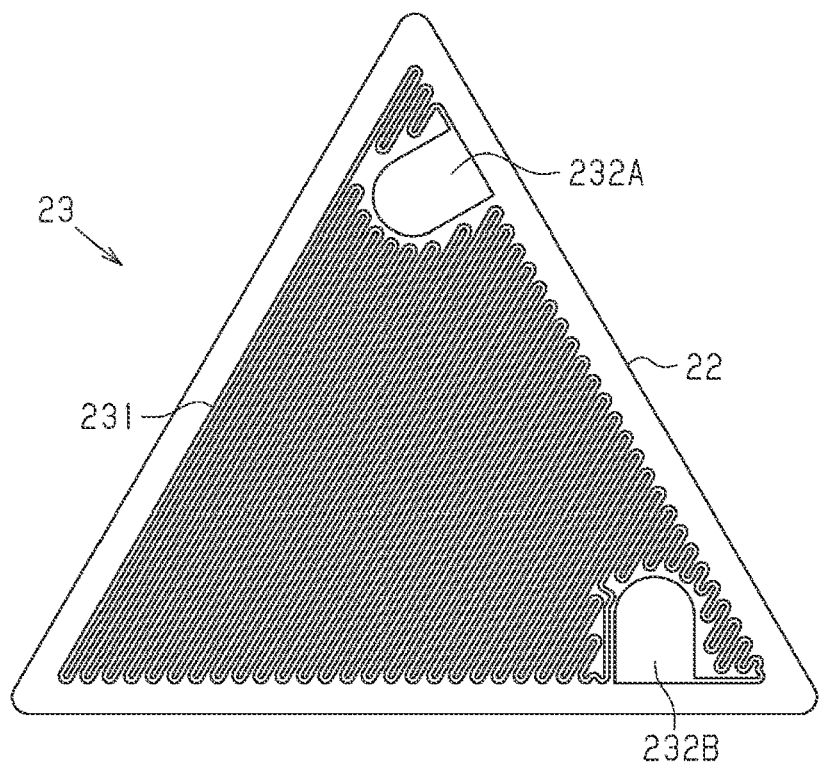
FIG. 9 is a diagram showing an example of a structure of a modified example of a current-carrying portion.

For example, as shown in FIG. 9, the heat generator 231 forming the current-carrying portion 23 has a triangular contour line. The wire portions 232A and 232B are arranged in the triangle. With this configuration, as long as the planar good thermal conductor 21 is configured to cover the entire heat generator 231, the temperature distribution is uniformed in the entire triangular plane surrounded by the contour line.

As in the modified example shown in FIG. 9, when the wire portions 232A and 232B are located in the plane surrounded by the contour line, the amount of heat generated is decreased in the range in which the wire portions 232A and 232B are located. Therefore, in the same manner as the wire portions 232A and 232B of the embodiment, it is preferred that the wire portions 232A and 232B are located outside the plane surrounded by the contour line and follow the contour line of the heat generator 231. This configuration effectively heats the plane surrounded by the contour line. Ultimately, the collection of objects is effectively limited.

At least one of the wire portions 232A and 232B may be configured not to include a conductive wire that follows the contour line and may extend from an end of the heating wire toward the outside of the plane surrounded by the contour line.

Figure 10:
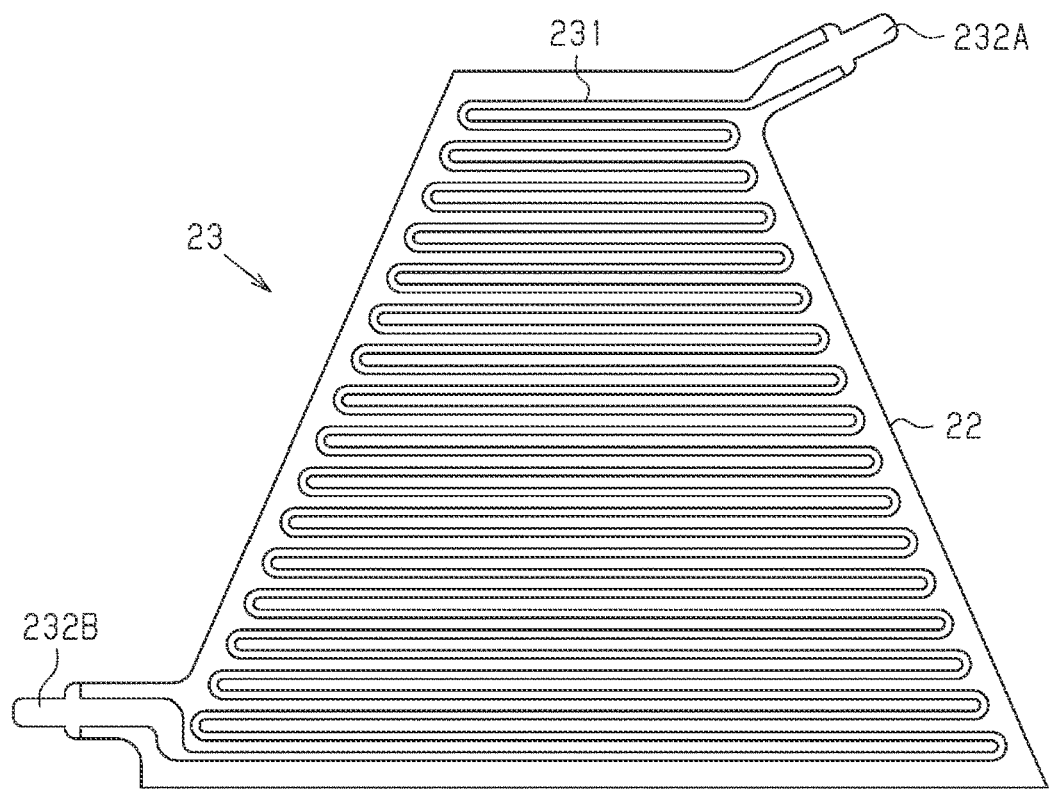
FIG. 10 is a diagram showing another example of a structure of a modified example of a current-carrying portion.

FIG. 10 shows an example of the heat generator 231 forming the current-carrying portion 23 and having an isosceles trapezoidal contour line. The heating wire has one end located at the right end of the upper base of the isosceles trapezoid. The heating wire has another end located at the left end of the lower base of the isosceles trapezoid. The wire portions 232A and 232B are located outside the isosceles trapezoid, that is, outside the plane surrounded by the contour line. The wire portion 232A extends rightward obliquely upward from the right end of the upper base of the isosceles trapezoid. The wire portion 232B extends leftward from the left end of the lower base of the isosceles trapezoid. With this configuration, as long as the planar good thermal conductor 21 is configured to cover the entire heat generator 231, the temperature distribution is uniformed in the entire isosceles trapezoidal plane surrounded by the contour line.

As in the modified example shown in FIG. 10, in a configuration in which the wire portion 232A and the wire portion 232B extend away from each other, the two ends for supplying current to the current-carrying portion 23 are separated as the wire portions 232A and 232B extend. Therefore, in the same manner as the wire portions 232A and 232B of the embodiment, it is preferred that at least one of the wire portions 232A and 232B is connected to the first end and follows a portion of the contour line extending from the first end toward the second end. This configuration obtains advantage (10) described above.

Any configuration may be used as long as at least one of the conductive wires of the planar heating element 20 is a subject conductive wire, the subject conductive wire is wider than each heating wire so that the subject conductive wire has a lower electrical resistivity than the heating wire, and the planar heating element 20 is configured so that the subject conductive wire follows the contour line. This configuration obtains advantages (9) and (11) described above.

In the embodiment and modified examples, the planar heating element 20 may be configured not to include the planar good thermal conductor 21, the conductive wire may be wider than the heating wire so that the conductive wire has a lower electrical resistivity than the heating wire, and the conductive wire may follow the contour line.

DESCRIPTION OF THE REFERENCE NUMERALS

WG) windshield; WL, WP) width; 11) camera cover; 12) camera bracket; 13) light blocking hood; 13S) light blocking sheet; 14) camera unit; 20) planar heating element; 21) planar good thermal conductor; 22) front insulation film; 23) current-carrying portion; 231) heat generator; 231L) linear portion; 231E) folded portion; 232A, 232B) wire portion; 24) rear insulation film; 25) protection circuit; 25A, 25B) heat-shrink tube; 25C) lead; 26) fixing tape; 27) first elastic sheet; 28) second elastic sheet; 29) external connector

The invention claimed is:
1. A planar heating element, comprising:
  a heating wire that is repeatedly folded in a manner covering a plane surrounded by a contour line; and
  first and second conductive wires configured to supply electric current to the heating wire, wherein
  the first and second conductive wires have a width that is greater than a width of the heating wire so that the first and second conductive wires have a lower electrical resistivity than the heating wire,
  the first and second conductive wires are located outside the plane,
  a heat generator included in the planar heating element is only the heating wire forming a series circuit, the heating wire and the first and second conductive wires are configured to be a single band-shaped conductor formed from the same material, the heating wire includes linear portions and folded portions, each of the folded portions are located on a peripheral edge of the heat generator and connects ends of adjacent ones of the linear portions, the heating wire extends throughout the plane, the heating wire includes a first end located at the contour line and a second end located at the contour line, the contour line includes a side that extends from the first end of the heating wire to the second end of the heating wire, the side of the contour line extending through the folded portions in the contour line, the contour line having an intermediate position between the first end and the second end, and the first conductive wire being connected to the first end of the heating wire and having a portion extending along a portion of the side of the contour line to the intermediate position, wherein the portion of the first conductive wire extending along the portion of the contour line having a width that is greater than the width of the heating wire.

2. The planar heating element according to claim 1, wherein the width of the first and second conductive wires is greater than or equal to two times the width of the heating wire.

3. The planar heating element according to claim 1, wherein the heating wire and the first and second conductive wires form a current-carrying portion, the planar heating element further comprises:

an insulation film that covers an entirety of the current-carrying portion; and a planar good thermal conductor that covers at least part of the current-carrying portion with the insulation film located between the planar good thermal conductor and the current-carrying portion.

4. The planar heating element according to claim 3, wherein the planar good thermal conductor covers at least part of the heating wire with the insulation film located between the planar good thermal conductor and the heating wire.

5. The planar heating element according to claim 3, wherein the insulation film is attached to the current-carrying portion, and the planar good thermal conductor is attached to the insulation film.

6. A vehicle windshield device, comprising:
a camera cover;
a camera unit located in the camera cover;
a light blocking hood located in the camera cover; and
a planar heating element configured to heat the light blocking hood, wherein the planar heating element is the planar heating element according to claim 1.

7. The planar heating element according to claim 1, wherein the first conductive wire extends from the first end located at the contour line to follow the entirety of the portion of the contour line extending from the first end toward the second end, the portion of the contour line being the side extending through the folded portions in the contour line.

8. A vehicle windshield device, comprising:
a camera cover;
a camera unit located in the camera cover;
a light blocking hood located in the camera cover; and
a planar heating element configured to heat the light blocking hood, wherein the planar heating element includes a current-carrying portion and an insulation film that covers an entirety of the current-carrying portion, the current-carrying portion includes
a heating wire that is repeatedly folded in a manner covering a plane surrounded by a contour line, and
first and second conductive wires configured to supply electric current to the heating wire, the first and second conductive wires have a width that is greater than a width of the heating wire so that the first and second conductive wires have a lower electrical resistivity than the heating wire, the first and second conductive wires are located outside the plane, a heat generator included in the planar heating element is only the heating wire forming a series circuit, the heating wire and the first and second conductive wires are configured to be a single band-shaped conductor formed from the same material, the heating wire includes linear portions and folded portions, each of the folded portions are located on the contour line and connects ends of adjacent ones of the linear portions, the heating wire extends throughout the plane, the heating wire includes a first end located at the contour line and a second end located at the contour line, the contour line includes a side that extends from the first end of the heating wire to the second end of the heating wire, the side of the contour line extending through the folded portions in the contour line, the contour line having an intermediate position between the first end and the second end, the first conductive wire being connected to the first end of the heating wire and having a portion extending along a portion of the side of the contour line to the intermediate position, wherein the portion of the first conductive wire extending along the portion of the contour line having a width that is greater than the width of the heating wire, and the vehicle windshield device further comprises a planar good thermal conductor that covers at least part of the current-carrying portion with the insulation film located between the planar good thermal conductor and the current-carrying portion.

9. The vehicle windshield device according to claim 8, wherein the light blocking hood includes the planar good thermal conductor.

10. The vehicle windshield device according to claim 8, wherein the first conductive wire extends from the first end located at the contour line to follow the entirety of the portion of the contour line extending from the first end toward the second end, the portion of the contour line being the side extending through the folded portions in the contour line.

* * * * *